United States Patent
Akiba et al.

[11] Patent Number: 5,479,740
[45] Date of Patent: Jan. 2, 1996

[54] FISHING ROD WITH FISHLINE LAID THROUGH IT

[75] Inventors: Masaru Akiba; Tomoyoshi Tsurufuzi, both of Tokyo, Japan

[73] Assignee: Daiwa Seiko, Inc., Tokyo, Japan

[21] Appl. No.: 193,647

[22] Filed: Feb. 7, 1994

Related U.S. Application Data

[63] Continuation of Ser. No. 978,073, Nov. 18, 1992, abandoned, which is a continuation of Ser. No. 831,372, Feb. 4, 1992, abandoned.

[30] Foreign Application Priority Data

Feb. 4, 1991  [JP]  Japan .................................. 3-3581 U
Feb. 4, 1991  [JP]  Japan .................................. 3-13230

[51] Int. Cl.⁶ ............................................... A01K 87/04
[52] U.S. Cl. .................................... 43/24; 43/18.1
[58] Field of Search .............................. 43/18.1, 24

[56] References Cited

U.S. PATENT DOCUMENTS

| | | | |
|---|---|---|---|
| 1,595,275 | 8/1926 | White | 43/18.1 |
| 2,282,618 | 5/1942 | Stewart | 43/18.1 |
| 2,324,429 | 7/1943 | Rondelli . | |
| 2,776,516 | 1/1957 | Jennette . | |
| 2,777,239 | 1/1957 | Cushman | 43/18.1 |
| 3,862,509 | 1/1975 | Petersen, Jr. . | |
| 4,183,163 | 1/1980 | Reimer . | |
| 4,212,126 | 7/1980 | Barnett | 43/24 |
| 5,159,776 | 11/1992 | Horton et al. | 43/24 |

FOREIGN PATENT DOCUMENTS

| | | | |
|---|---|---|---|
| 2467546 | 5/1981 | France | 43/24 |
| 56-127032 | 10/1981 | Japan . | |
| 1178373 | 12/1989 | Japan . | |

*Primary Examiner*—Kurt Rowan
*Attorney, Agent, or Firm*—Longacre & White

[57] ABSTRACT

A fishing rod through which a fishline is laid, includes: a tubular member having a slot slenderly extending in the longitudinal direction; an outer member provided on the slot; and guide member provided in the outer member for guiding the fishline from outside of the tubular member to inside thereof without coming into contact with inner and outer circumferential surfaces of the tubular member, wherein the guide member is slightly obliquely provided with respect to an axis of the tubular member.

15 Claims, 5 Drawing Sheets

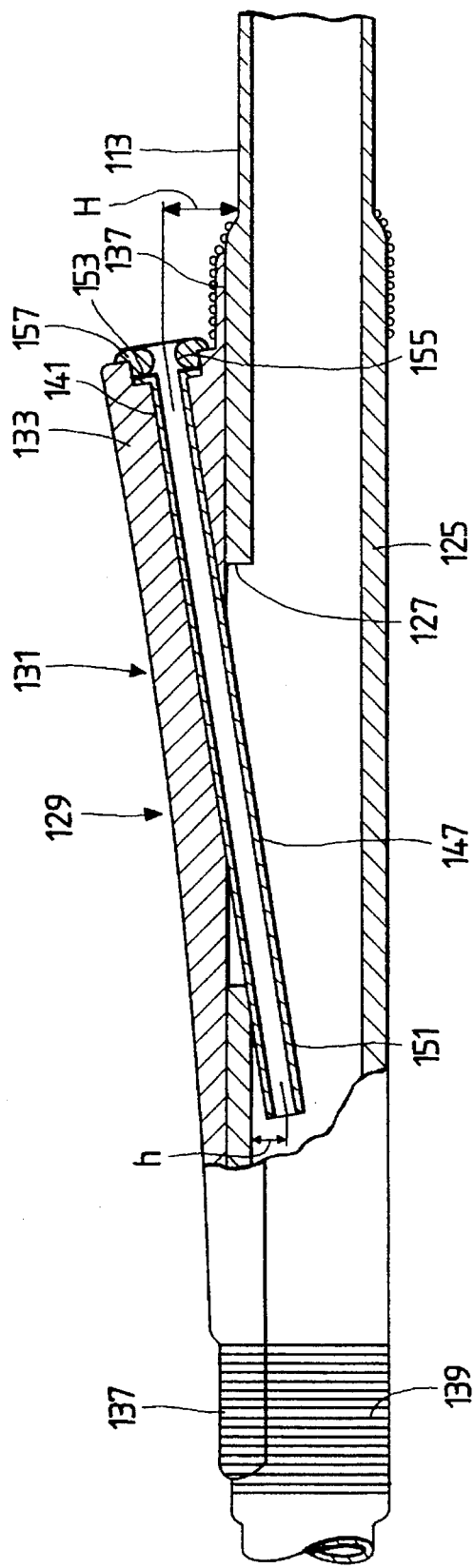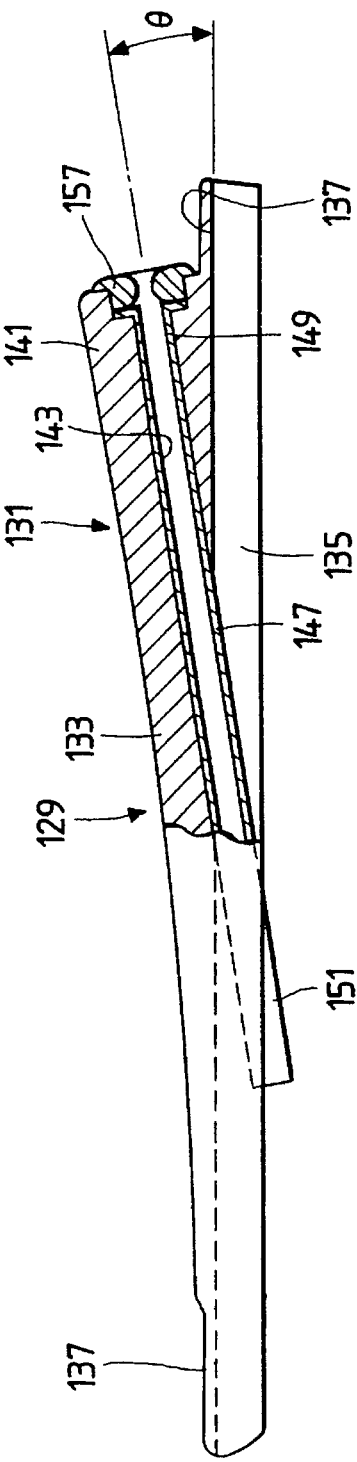

FISHING ROD WITH FISHLINE LAID THROUGH IT

This is a continuation of application Ser. No. 07/978,073, filed Nov. 18, 1992, which was abandoned upon the filing thereof, which is a continuation of application Ser. No. 07/831,372, filed Feb. 04, 1992, which was abandoned upon the filing hereof.

BACKGROUND OF THE INVENTION

The present invention relates to a fishing rod, more particularly to a fishing rod through which a fishline is laid in the use of the rod.

There has been known a conventional fishing rod of the type in which a fishline is put into the tubular member of the rod through a fishline guide provided on the tubular member and is then taken out from the tip of the rod so that the fishline extends through the fishline guide and the tubular member.

Such a fishing rod was disclosed in Japanese Utility Model Application (OPI) No. Hei. 1-178373 and Japanese Patent Application (OPI) No. Sho. 56-127032 (the term "OPI" as used herein means an "unexamined published application").

With respect to Japanese Utility Model Application No. Hei. 1-178373, a fishline passage member is provided in the coupled portions of the mutually-adjacent tubular members of the fishing rod, and has a fishline passage hole.

However, since the conventional fishing rod has the fishline passage member having the fishline passage hole and provided in the coupled portions of the mutually-adjacent tubular members of the rod, there is a problem that the strength of the coupled portions is extremely lowered due to the notch of the anterior tubular member for the fishline passage hole although each of the coupled portions has a double constructions. Since it is difficult to reduce the angle between the axis of the fishline passage hole and that of the tubular member, there is a problem that the fishline extending from the hole bends at a large angle into the tubular member to result in increasing the resistance of the fishing guide to the sliding of the fishline. If the angle between the axis of the fishline passage hole and that of the tubular member is to be reduced, a slot slenderly extending in the longitudinal direction of the member needs to be provided therein. However, since the coupled portion of the tubular member has the double construction, there is a problem that it is difficult to provide the slot in the member. If the slot is provided in the tubular member, there are problems that the length of the coupled portion of the member is made very large and the weight of the portion is increased.

With respect to Japanese Patent Application No. Sho. 56-127032, the fishing rod includes the fishline guide having an outer member shaped as a plate and having a recess, in the outer portion of which a guide ring is secured.

However, since a fishline is guided by the single guide ring of the fishline guide disclosed in the above-mentioned Application, there is a problem that the fishline is likely to come into contact with the outer surface or/and inner surface of the tubular member of a fishing rod. Since the fishline is bent at a large angle by the single guide ring, there is a problem that the resistance of the fishline guide to the sliding of the fishline is high. Since the outer member of the fishline guide is fixed to the tubular member of the fishing rod simply at the front and rear portions of the outer member, there is a problem that the portions are likely to be damaged.

SUMMARY OF THE INVENTION

The present invention was made in order to solve the above-mentioned problems. Accordingly, it is an object of the invention to provide such a fishing rod that a fishline is laid through the tubular member of the rod, the rigidity of the tubular member is much higher at the fishline guide of the rod than that of the tubular member of the conventional fishing rod at the fishline guide thereof, the resistance of the former fishlines guide to the sliding of the fishline is much lower than that of the latter fishline guide to the sliding of the fishline, and the former fishline guide is more firmly and securely fixed to the tubular member of a fishing rod than the latter is.

According to the present invention, a fishing rod through which a fishline is laid includes: a tubular member having a slot slenderly extending in the longitudinal direction; an outer member provided on the slot; and guide member provided in the outer member for guiding the fishline from outside of the tubular member to inside thereof without coming into contact with inner and outer circumferential surfaces of the tubular member, wherein the guide member is slightly obliquely provided with respect to an axis of the tubular member.

As for the fishing rod provided in accordance with the present invention, the fishline is put into the fishline passage from its rear end located outside the tubular member of the fishing rod and is then taken out form the passage's front end located inside the tubular member, so that the fishline extends into the member through the guide.

BRIEF DESCRIPTION OF THE DRAWINGS

FIG. 5 is a longitudinally sectional view of a fishing rod and a fishline guide which is another embodiment of the present invention;

FIG. 6 is a longitudinally sectional view of the fishline guide;

DETAILED DESCRIPTION OF THE PREFERRED EMBODIMENTS

An embodiment of the present invention is hereafter described in detail with reference to the drawings attached hereto.

Figure 1:
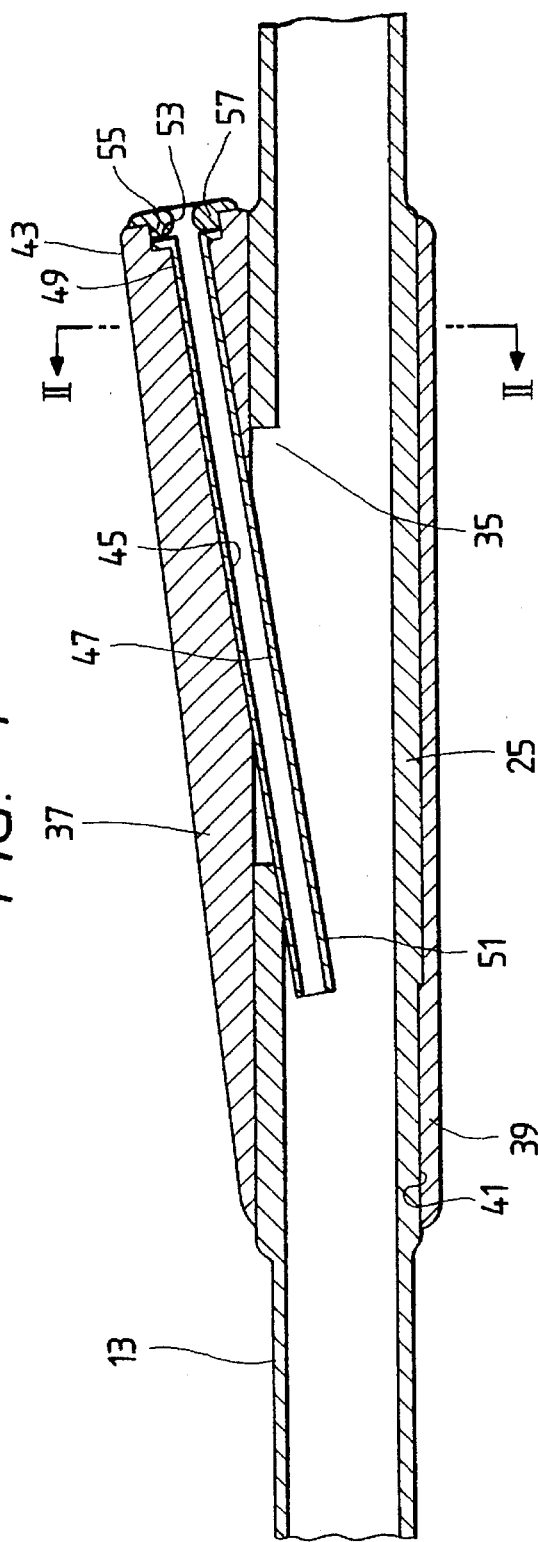
FIG. 1 is a longitudinal sectional view of the fishline guide of a fishing rod which is an embodiment of the present device and through which a fishline is laid.
Figure 2:
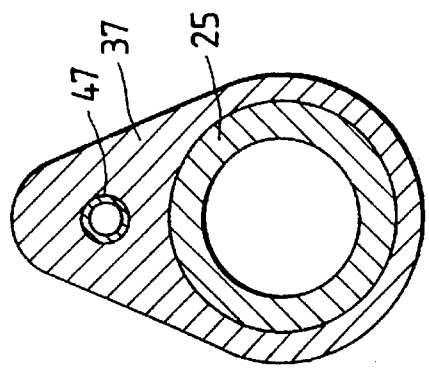
FIG. 2 is a cross-sectional view of the fishline guide along lines II shown in FIG. 1.
Figure 3:
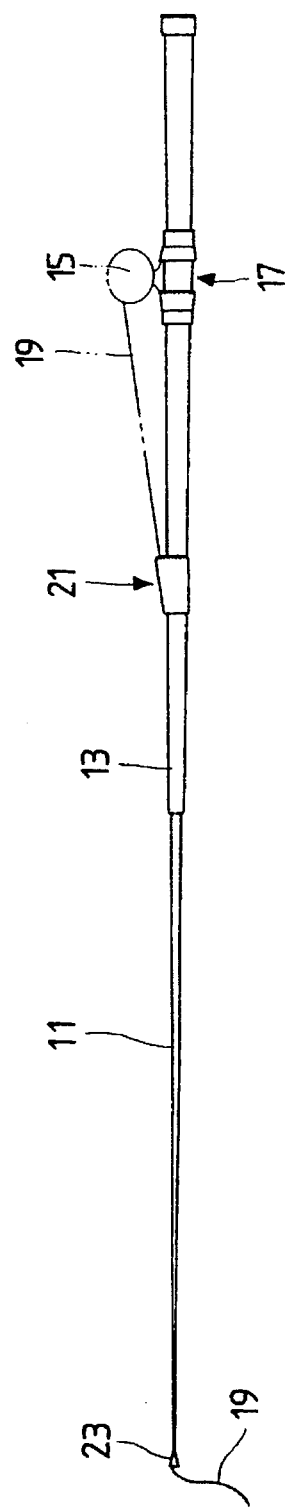
FIG. 3 is a side view of the fishing rod.

FIGS. 1, 2 and 3 show a fishing rod which is one of the embodiments and through which a fishline is laid. FIG. 1 is a longitudinally sectional view of the fishline guide of the fishing rod. FIG. 2 is a cross-sectional view of the fishline guide along lines II shown in FIG. 1. FIG. 3 is a side view of the fishing rod.

Shown at 11 and 13 in FIG. 3 are the anterior tubular member of the fishing rod and the posterior tubular member thereof, respectively. A reel rest 17 is provided on the posterior tubular member 13 in order to fasten a reel 15 to the fishing rod. The posterior tubular member 13 is provided with the fishline guide 21 through which a fishline 19 extending from the reel 15 is guided into the tubular member. The anterior tubular member 11 has a fishline outgoing portion 23 at the tip of the member so that the fishline 19 extending in the member is taken out therefrom through the portion.

Figure 4:
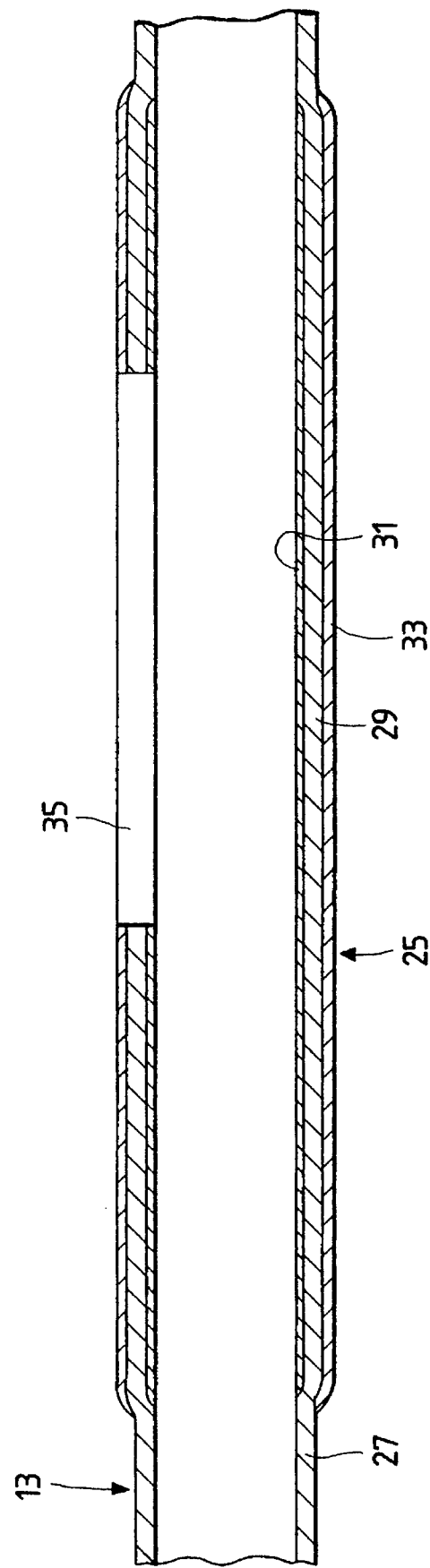
FIG. 4 is a longitudinally sectional view of the thick portion of the fishing rod.

Shown at 25 in FIGS. 1 and 2 is the thick portion of the posterior tubular member 13. The thick portion 25 is composed of an intermediate layer 29 nearly equal in thickness to the other portions 27 of the tubular member 13 but slightly larger in diameter than the other portions, an inner layer 31 integrally formed on the inner surface of the intermediate layer, and an outer layer 33 integrally formed on the outer surface of the intermediate layer, as shown in FIG. 4. The intermediate layer 29 extends from the outer portions 27 of the tubular member 13, and is made of the same composite material as the other portions. For example, the material includes a reinforcing component which is high-strength fibers, most of them extend in the longitudinal direction of the intermediate layer 23. For example, the inner layer 31 is made of a composite material including a reinforcing component which is a woven fabric of reinforcing fibers such as fiberglass and organic fibers, and the outer layer 33 is made of a composite material including a reinforcing component which is a woven fabric of high-strength fibers such as carbon fibers and fiberglass. The thick portion 25 has a mortise or slot 35 slenderly extending in the longitudinal direction of the tubular member 13.

The fishline guide 21 includes a sleeve 37, a substantially straight guide tube 47, and a guide ring 57. The sleeve 37 has nearly the same length as the thick portion 25, and is secured to the outer circumferential surface of the portion by an adhesive. The sleeve 37 has a positioning projection 39 on the inner circumferential surface of the sleeve at the front end thereof. The projection 39 is fitted on the smaller-diameter part 41 of the thick portion 25. The sleeve 37 may be formed integrally to the thick portion 25. The sleeve 37 has a guide hole 45 extending from the rear end of the sleeve to the inner circumferential surface thereof obliquely to the axis of the thick portion 25 and communicating with the slot 35 thereof. The guide tube 47 is fixedly fitted in the guide hole 45 so that the rear end 49 of the tube is located outside the tubular member 13 of the fishing rod, and the front end 51 of the tube is located inside the member. The guide tube 47 has a flange 53 at the rear end of the tube. The flange 53 is fitted in the recess 55 of the rear end surface of the sleeve 37. The guide tube 47 is secured to the sleeve 37 by sticking or press-fitting into the guide groove 37a. The guide ring 57 is made of a wearproof material such as silicon carbide, zirconia and alumina, and fixedly fitted in the recess 55. When the guide tube 47 is fitted in the sleeve 37 and the thick portion 25, the front end 51 of the tube comes into contact with the thick portion at the front end of the slot 35 thereof and then protrudes into the internal opening of the tubular member 13.

The guide tube 47 is chamfered or has a curved surface at the front end of the inner circumferential surface of the tube. The angle between the axis of the guide tube 47 and that of the tubular member 13 should preferably be 20 degrees or less, and more preferably be 5 to 15 degrees. The outside diameter of the guide tube 47 should preferably be 30% or less of that of the thick portion 25 in order to make the width of the slot 35 thereof small enough to avoid lowering the strength of the tubular member 13.

As described above, the fishing rod includes the posterior tubular member 13 having the thick portion 25 having the slot 35 slenderly extending in the longitudinal direction of the member, and the fishline guide 21 including the sleeve 37 provided on the outer circumferential surface of the thick portion and having the guide hole 45 extending from the rear end 43 of the sleeve to the slot obliquely to the axis of the tubular member, and the substantially straight guide tube 47 fixedly fitted in the guide hole and located outside the tubular member at the rear end 49 of the tube and inside the member at the front end 51 of the tube. For that reason, the rigidity of the tubular member 13 is much higher at the fishline guide 21 than that of the tubular member of the conventional fishing rod at the fishline guide thereof, and the resistance of the former fishline guide to the sliding of the fishline 19 is much lower than that of the latter fishline guide to the sliding of the fishline. In other words, since the thick portion 25 having the slot 35 is formed in the tubular member 13 except at the coupled portion thereof and fitted with the sleeve 37 and the guide tube 47 is secured in the sleeve, the rigidity of the tubular member 13 is much higher at the fishline guide 21 than that of the tubular member of the conventional fishing rod at the fishline guide thereof. The outside diameter of the guide tube 47 is made small enough to minimize the width of the slot 35 to avoid lowering the rigidity of the tubular member 13 at the fishline guide 21. The angle between the axis of the guide tube 47 and that of the tubular member 13 is easily reduced so that the resistance of the fishline guide 21 to the sliding of the fishline 19 is much lower than that of the fishline guide of the conventional fishing rod to the sliding of the fishline. Since the guide ring 57 is provided on the guide tube 47 at the rear end thereof and the tube is chamfered or has the curved surface at the front end of the inner circumferential surface of the tube, the resistance of the fishline guide 21 to the sliding of the fishline 19 is lowered further.

It is easy to locate the fishline guide 21 at a prescribed distance from the reel rest 17 and locate the rear end 49 of the guide tube 47 at a prescribed distance from the tubular member 13 of the fishing rod so as to prevent the fishline guide from interfering with a hand grasping the reel rest and prevent the fishline 19 from coming into contact with the hand, as shown in FIG. 3. Since the thick portion 25 has a multilayer construction as described above, the portion does not undergo small splits at the time of the making of the slot 35 therein, at the time of the use of the portion or at the time of the like and does not undergo a crack, a tear or the like even at the time of the action of high stress to the portion at the slot.

Although the fishing guide 21 is provided on the posterior tubular member 13 of the fishing rod, the present device is not confined thereto but may be otherwise embodied. For example, such a fishline guide may be provided on the intermediate tubular member of a fishing rod.

Figure 7:
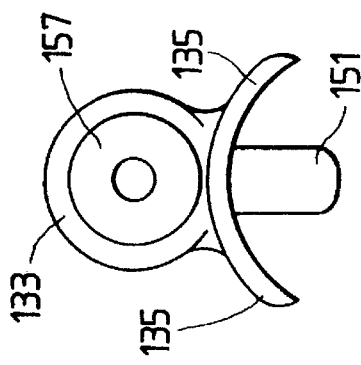
FIG. 7 is a front view of the fishline guide.
Figure 8:
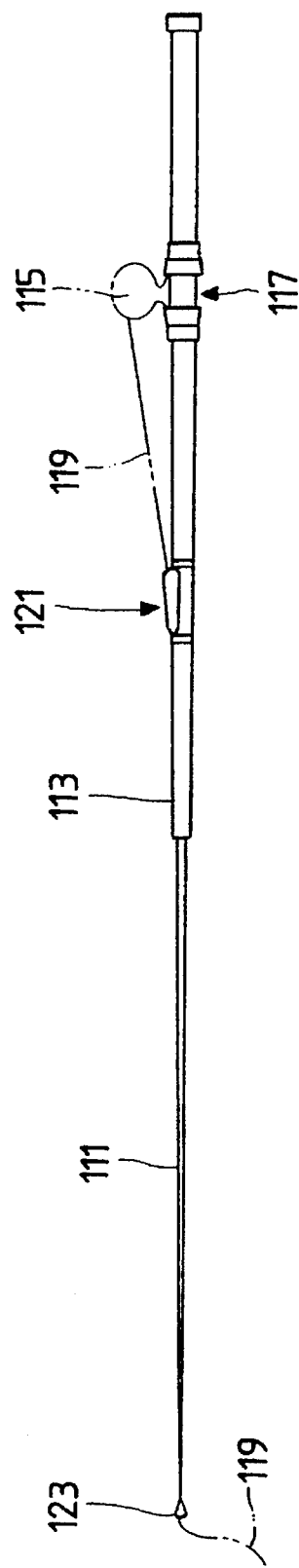
FIG. 8 is a side view of the fishing rod and the fishing guide.

FIGS. 5, 6, 7 and 8 show a fishline guide 121 which is another of the embodiments of the present invention. FIG. 5 is a longitudinally sectional view of the fishline guide 121 in the state that it is secured to the tubular member of a fishing rod through which a fishline is laid. FIG. 6 is a longitudinally sectional view of the fishline guide 121. FIG. 7 is a front view of the fishline guide 121. FIG. 8 is a side view of the fishing rod.

Shown at 111 and 113 in FIG. 8 are the anterior tubular member of the fishing rod and the posterior tubular member thereof, respectively. A reel rest 117 is provided on the posterior tubular member 113 in order to fasten a reel 115 to the fishing rod. The fishline guide 121 is provided on the posterior tubular member 113 so that the fishline 119 extending from the reel 115 is put into the tubular member through the guide. The anterior tubular member 111 has a fishline outgoing portion 123 at the tip of the member so that the fishline 119 extending in the member is taken out therefrom through the portion.

Shown at 125 in FIG. 5 is the thick portion of the posterior tubular member 113 of the fishing rod. The thick portion 125 has a slot 127 slenderly extending in the longitudinal direction of the tubular member 113.

The fishline guide 121 includes a fishline guide member 129 provided on the thick portion 125 of the posterior tubular member 113. The fishline guide member 129 is an outer member 131 covering the slot 127 of the tubular member 113. The outer member 131 includes a body 133 covering the slot 127, side portions 135 formed on both the sides of the body along the length thereof and located on the outer circumferential surface of the tubular member 113, and mounting portions 137 formed at the front and rear ends of the body, as shown in FIGS. 6 and 7. The body 133 slopes down from the rear end thereof to the front end thereof with regard to the axis of the tubular member 113, and is relatively large in thickness. The side portions 135 are relatively small in thickness, and nearly equal in curvature to the outer circumferential surface of the thick portion 125 of the tubular member 113. The mounting portions 137 are relatively small in thickness, nearly equal in curvature to the outer circumferential surface of the thick portion 125, and secured to the tubular member 113 by yarns 139 wound on the thick portion. The body 133 has a substantially straight guide hole 143 extending from the rear end 141 of the body to the slot 127 of the thick portion 125 slightly obliquely to the axis of the tubular member 113. The angle $\theta$ between the axis of the guide hole 143 and the outer circumferential surface of the tubular member 113 should preferably be 3 to 20 degrees, and more preferably be 5 to 15 degrees.

The fishline guide 121 also includes a substantially straight guide tube 147 fixedly fitted in the guide hole 143 so that the guide tube defines a fishline passage, the rear end 149 of the tube is located outside the tubular member 113, and the front end 151 of the tube is located inside the member. The height H of the center of the rear end 149 of the guide tube 147 from the outer circumferential surface of the tubular member 113 should preferably be 1 mm or more, and more preferably be 3 to 20 mm. The depth h of the center of the front end 151 of the tube 147 from the inner circumferential surface of the tubular member 113 should preferably be such that the fishline 119 extending from the front end 151 of the tube into the tubular member does not come into contact with the inner circumferential surface of the member, or the center is located on the axis of the member. For example, the depth h is set preferably at 1 to 15 mm. The guide tube 147 has a flange 153 at the rear end 149 of the tube. The flange 153 is fitted in a recess 155 formed in the rear end surface of the body 133 of the outer member 131. The tube 147 is secured to the body 133 by sticking or press-fitting. When the guide tube 147 is fitted in the guide hole 143 of the body 133, the front end 151 of the tube comes into contact with the thick portion 125 of the tubular member 113 at the slot 127 thereof and then protrudes into the tubular member. The tube 147 is chamfered or has a curved surface at the front end of the inner circumferential surface of the tube. The outside diameter of the tube 147 should preferably be 30% or less of that of the thick portion 125 in order to make the width of the slot 127 thereof small enough to avoid lowering the strength of the tubular member 113.

The fishline guide 121 further includes a guide ring 157 made of a wearproof material such as silicon carbide, zirconia and alumina and fixedly fitted in the recess 155 of the body 133 of the outer member 131.

As described above, the outer member 131 includes the body 133 covering the slot 127 of the tubular member 113 of the fishing rod, the side portions 135 formed on both the sides of the body along the length thereof and located on the outer circumferential surface of the tubular member, and the substantially straight guide hole 143 extending from the rear end 141 of the body to the slot slightly obliquely to the axis of the tubular member, and the guide tube 147 is fitted in the guide hole so that the tube defines the fishline passage, the rear end 141 of the tube is located outside the tubular member, and the front end 151 of the tube is located inside the member. For that reason, the resistance of the fishline guide 121 to the sliding of the fishline 119 is much lower than that of the conventional fishline guide to the sliding of the fishline, and the former fishline guide is more firmly and securely fixed to the tubular member 113 than the latter fishline guide is. In other words, since it is easy to reduce the angle between the axis of the guide tube 147 of the fishline guide 121 and that of the tubular member 113 and the fishline 119 is guided by the rear end 141 and front end 151 of the tube and does not come into contact with the inner and outer circumferential surfaces of the tubular member, the resistance of the fishline guide to the sliding of the fishline is much lower than that of the conventional fishline guide to the sliding of the fishline. Since the guide ring 157 is provided on the rear end of the guide tube 147 and the tube is chamfered or has the curved surface at the front end of the inner circumferential surface of the tube, the resistance of the fishline guide 121 to the sliding of the fishline is still more reduced. It is easy to locate the fishline guide 121 at the prescribed distance from the reel rest 117 and locate the rear end 149 of the guide tube 147 at the prescribed distance from the tubular member 113 so as to prevent the fishline guide from interfering with a hand grasping the reel rest and prevent the fishline 119 from coming into contact with the hand, as shown in FIG. 8. Since the outer member 131 has the side portions 135 formed on both the sides of the body 133 of the member and located on the tubular member 113, the outer member can be tightly fitted on the tubular member and firmly and securely fixed thereto.

Figure 9:
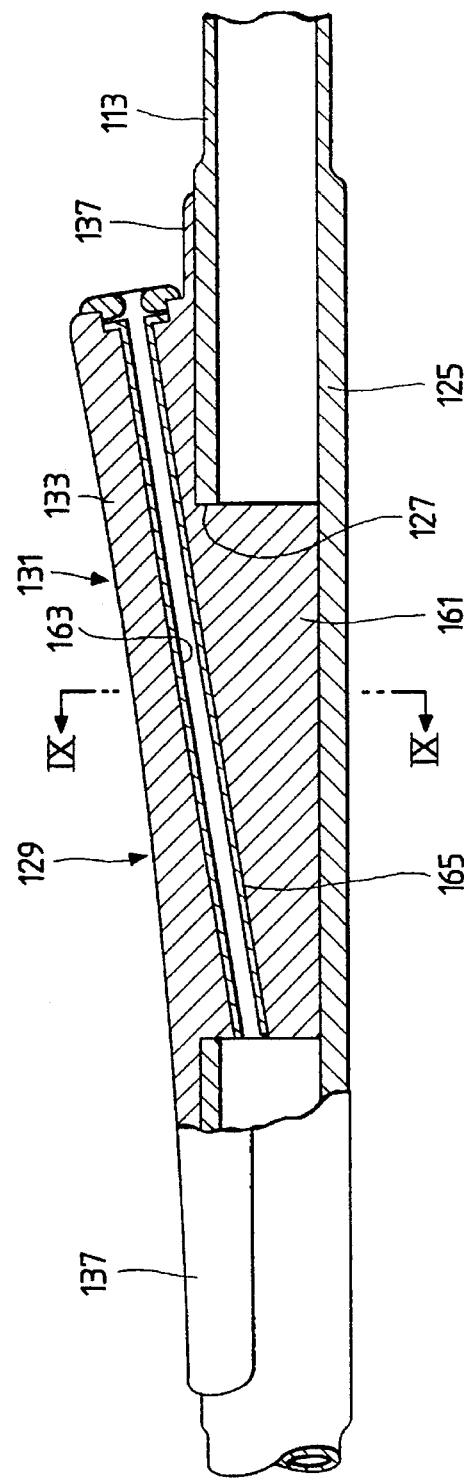
FIG. 9 is a longitudinally sectional view of a fishline guide which is another embodiment of the present invention.
Figure 10:
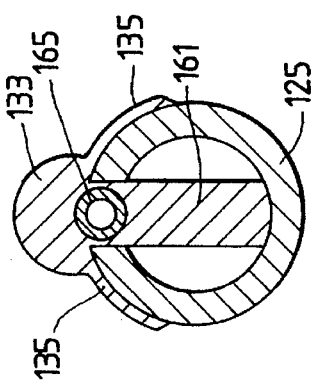
FIG. 10 is a cross-sectional view of the fishline guide along lines X—X shown in FIG. 9.

FIGS. 9 and 10 show a fishline guide 129 which is another of the embodiments. The fishline guide 129 includes an outer member 131 including a body 133 and a support jut 161 extending down from the body and fitted in the slot 127 of the thick portion 125 of the tubular member 113 of a fishing rod through which a fishline is laid. The tip of the support jut 161 is located in contact with the inner circumferential surface of the tubular member 113. The outer member 131 has a guide hole 163 extending through the body 133 and the support jut 161. The fishline guide 129 also includes a guide tube 165 fitted in the guide hole 163. As a result, the fishline guide 129 produces the same effects as that 121 does. Since the outer member 131 has the support jut 161 on the body 133, the outer member can be more firmly and securely fixed to the tubular member 113 than the preceding outer member is.

Although the outer member 131 of each of the embodiments has the mounting portions 137 formed at the front and rear ends of the body 133 and secured to the tubular member 113 by the yarns 139, the present invention is not confined thereto. For example, the invention may be embodied in such a manner that the outer member 131 does not have the mounting portions 137, and the side portions 135 are secured to the tubular member 113 by sticking. Although the guide tubes 147 and 165 are provided to define the fishline passages in the embodiments, the present invention is not confined thereto. For example, the invention may be embodied in such a manner that the guide tube is not provided, and the guide hole of the outer member is directly used as a fishline passage.

Figure 11:
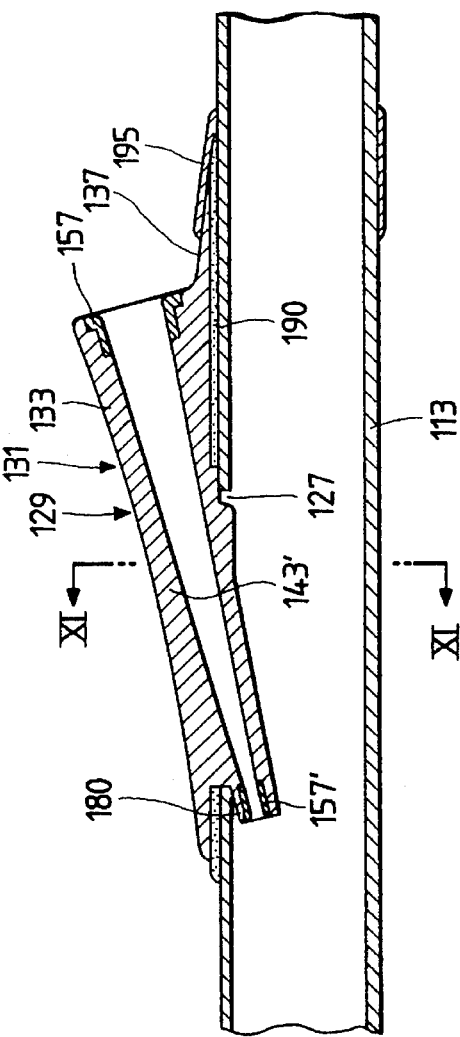
FIG. 11 is a longitudinally sectional view of a fishline guide which is another embodiment of the present invention.

FIG. 11 shows a fishline guide 129 which is further another of the embodiments. The fishline guide 129 includes an outer member 131 including a body 133, an attaching portion 180 formed at front end thereof for being fittingly engaged with front edge of the slot, and a mounting portion 137 formed at rear end thereof. In this embodiment, the fishline guide 129 is secured to the tubular member 113 by fitting the attaching portion 180 with the front edge of the slot 127 and winding the yarn 139 on the mounting portion 137. As shown in FIG. 11, a shock absorbing layer 190 made of solid rubber and the like is provided between the outer member 131 and the tubular member 113. This embodiment is not confined thereto. For example, the attaching portion 137 may be formed at rear end of the body 133 to be fittingly engaged with the rear edge of the slot 127, and the mounting portion 137 may be formed at front end of the body 133. In addition, the mounting portion may be secured to the tubular member by a ring member 195. Further, the outer diameter of the guide hole 143' is formed to be gradually elongated toward the rear end. The cross-section of the guide hole 143' along lines XI shown in FIG. 11 is elliptic in shape, and the body 133 is provided with guide rings 157 and 157' at both ends in order to reduce frictional resistance. According to this embodiment, since the attaching portion is provided to the body, the fishline guide can be easily secured to the tubular member by only one-sided fixing operation.

A fishing rod provided in accordance with the first aspect of the invention includes a tubular member including a thick portion having a slot slenderly extending in the longitudinal direction of the tubular member; and a fishline guide including a sleeve fitted on the thick portion and having a guide hole extending from the rear end of the sleeve to the slot obliquely to the longitudinal direction, and a substantially straight guide tube fixedly fitted in the guide hole and located outside the tubular member at the rear end of the tube and inside the member at the front end of the tube. For that reason, the rigidity of the tubular member is much higher at the fishline guide than that of the tubular member of the conventional fishing rod at the fishline guide thereof, and the resistance of the guide to the sliding of the fishline is much lower than that of the fishline guide of the conventional fishing rod to the sliding of a fishline.

A fishing rod provided in accordance with the second aspect of the present invention includes an outer member including a body covering the slot of the tubular member of a fishing rod, side portions formed on both the sides of the body along the length thereof and located on the outer circumferential surface of the tubular member, and a substantially straight guide hole extending through the body form the rear end thereof to the slot slightly obliquely to the axis of the tubular member so as to serve as a fishline passage. The fishline guide may include a guide tube in the guide hole so as to define a fishline passage. The rear end of the fishline passage is located outside the tubular member, and the front end of the passage is located inside the member. As a result, the resistance of the fishline guide to the sliding of a fishline is much lower than that of the conventional fishline guide to the sliding of the fishline, and the former fishline guide can be more firmly and securely fixed to the tubular member than the latter is.

What is claimed is:

1. A fishing rod through which a fishline is laid, comprising:

a jointless tubular member comprising substantially constant inner and outer radial dimensions and an elongated mortise extending along a longitudinal axis of said tubular member, said constant inner radial dimension defining an open interior of the rod through which said fishline is adapted to pass;

an outer member provided on said tubular member to cover said mortise;

guide means provided in said outer member for guiding the fishline from the outside of said tubular member to inside thereof without coming into contact with inner and outer circumferential surfaces of said tubular member, said guide means comprising a first end located radially outside said constant outer radial dimension and a second end located radially inside said constant inner radial dimension, and a single, straight longitudinal section extending between said first and second ends, wherein said single longitudinal section defines a single axis of said guide means which is slightly oblique with respect to said longitudinal axis of said tubular member, said guide means further comprises a continuous guide tube through which the fishline is introduced into said tubular member, said guide tube extending substantially straight from said first end to said second end, and said tubular member is radially interposed between said guide tube and said outer member, and said guide tube extends beyond said elongated mortise along said longitudinal axis.

2. The fishing rod according to claim 1, wherein said first end lies on a plane perpendicular to said single axis.

3. The fishing rod according to claim 1, wherein said second end lies on a plane perpendicular to said single axis.

4. The fishing rod according to claim 1, wherein said first end lies on a first plane perpendicular to said single axis, and said second end lies on a plane perpendicular to said single axis.

5. A fishing rod according to claim 1, wherein said tubular member has thick portion on which said outer member is fixedly fitted.

6. A fishing rod according to claim 5, wherein said thick portion comprises an intermediate layer, an inner layer integrally formed on an inner surface of said intermediate layer, and an outer layer integrally formed on an outer surface of said intermediate layer, and wherein said inner layer, intermediate layer and said outer layer extend the entire circumference of said tubular member.

7. A fishing rod according to claim 1, wherein said outer member is a sleeve which is fixedly fitted over said mortise.

8. A fishing rod according to claim 1, wherein said outer member comprises: a body covering said mortise; and side portions formed on both sides of said body along the length of said body and located on the outer circumferential surface of said tubular member.

9. A fishing rod according to claim 1, wherein an angle between said axis of said guide means and said axis of said tubular member is 5 to 15 degrees.

10. A fishing rod according to claim 1, wherein an outside diameter of said guide tube is 30% or less of that of said tubular member.

11. A fishing rod according to claim 1, wherein the height of the center of the first end of said guide tube from the outer circumferential surface of said tubular member is 3 to 20 mm.

12. A fishing rod according to claim 1, wherein said guide means further includes a guide ring fitted with the first end thereof.

13. A fishing rod according to claim 1, wherein a shock absorbing member is provided between said tubular member and said outer member.

14. The fishing rod according to claim 1, further comprising resistance reducing means provided on at least one of said first and second ends for reducing resistance on the fishing line.

15. A fishing rod through which a fishline is laid, comprising:

a jointless tubular member comprising substantially constant inner and outer radial dimensions and an elongated mortise extending along a longitudinal axis of said tubular member, said constant inner radial dimension defining an open interior of the rod through which said fishline is adapted to pass;

an outer member provided on said tubular member to cover said mortise; and a continuous guide tube supported by said outer member for guiding the fishline from the outside of said tubular member to inside thereof therethrough without coming into contact with inner and outer circumferential surfaces of said tubular member, said continuous guide tube having a first end located radially outside said constant outer radial dimension and a second end located radially inside said constant inner radial dimension, and a single, straight longitudinal section extending between said first and second ends, wherein:

said single longitudinal section defines a single axis of said guide tube; and said tubular member is radially interposed between said guide tube and said outer member, and said guide tube extend beyond said elongated mortise along said longitudinal axis.

* * * * *